US010358172B2

(12) United States Patent
Morley et al.

(10) Patent No.: US 10,358,172 B2
(45) Date of Patent: Jul. 23, 2019

(54) LATCHING ASSEMBLY FOR MULTI-FUNCTIONAL TAILGATE DOOR

(71) Applicants: John B Morley, Waterford, MI (US); Eric Ghoukasian Khouygani, Auburn Hills, MI (US)

(72) Inventors: John B Morley, Waterford, MI (US); Eric Ghoukasian Khouygani, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 32 days.

(21) Appl. No.: 15/843,963

(22) Filed: Dec. 15, 2017

(65) Prior Publication Data
US 2019/0185074 A1    Jun. 20, 2019

(51) Int. Cl.
| | |
|---|---|
| *B62D 33/027* | (2006.01) |
| *B62D 33/03* | (2006.01) |
| *B62D 33/037* | (2006.01) |
| *E05B 85/24* | (2014.01) |
| *E05B 83/20* | (2014.01) |

(52) U.S. Cl.
CPC ....... *B62D 33/037* (2013.01); *B62D 33/0273* (2013.01); *B62D 33/03* (2013.01); *E05B 85/243* (2013.01); *E05B 83/20* (2013.01)

(58) Field of Classification Search
CPC .. B62D 33/0273; B62D 33/03; B62D 33/037; E05B 85/243; E05B 83/20
USPC ..................... 296/50, 51, 57.1; 292/DIG. 29
See application file for complete search history.

(56) References Cited

U.S. PATENT DOCUMENTS

| | | | | |
|---|---|---|---|---|
| 4,076,301 | A * | 2/1978 | Gergoe | B60J 5/103 16/232 |
| 5,685,594 | A * | 11/1997 | Harper | B62D 33/0273 292/175 |
| 6,676,196 | B1 * | 1/2004 | Smith | E05D 15/52 296/146.12 |
| 6,779,825 | B1 * | 8/2004 | Greened | B60P 1/26 296/50 |
| 7,481,479 | B1 * | 1/2009 | Townson | B62D 33/0273 16/223 |
| 7,699,373 | B2 * | 4/2010 | Miller | B60P 3/40 296/26.09 |
| 8,061,753 | B2 * | 11/2011 | Papanikolaou | B62D 33/0273 16/224 |
| 8,136,862 | B2 * | 3/2012 | Bator | B62D 33/0273 296/57.1 |

(Continued)

*Primary Examiner* — Gregory A Blankenship
(74) *Attorney, Agent, or Firm* — Ralph E. Smith (57) ABSTRACT

A vehicle includes a cargo bed, one door, and a latch assembly. The cargo bed includes a plurality of walls. The one door is coupled to the cargo bed and pivotable about a horizontal axis between a closed position and a horizontal open position, and about a vertical axis between the closed position and a vertical open position. The latch assembly includes a striker pin, a latch mechanism, a receiver, and a cam. The striker pin is attached to a respective one of the plurality of walls so as to extend outwardly therefrom. The latch mechanism coupled to the door and selectively latched onto the striker pin. The receiver is coupled to the respective one of the plurality of walls. The cam is coupled to the latch mechanism and the one door. The cam and the receiver cooperate to restrict vertical movement of the one door when the one door is pivotable about the vertical axis.

11 Claims, 7 Drawing Sheets

(56) References Cited

U.S. PATENT DOCUMENTS

| | | | | |
|---|---|---|---|---|
| 8,740,279 B1* | 6/2014 | McGoff | ............... | E05B 83/20 |
| | | | | 296/51 |
| 10,093,362 B2* | 10/2018 | Estrada | ............... | B62D 33/037 |
| 2005/0035620 A1* | 2/2005 | Ichinose | ............... | B60P 1/26 |
| | | | | 296/51 |
| 2005/0057063 A1* | 3/2005 | Thiele | ............... | B60P 1/26 |
| | | | | 296/50 |
| 2006/0001288 A1* | 1/2006 | Thiele | ............... | B60P 1/26 |
| | | | | 296/50 |
| 2007/0284903 A1* | 12/2007 | Waldner | ............... | B62D 33/037 |
| | | | | 296/51 |
| 2007/0296226 A1* | 12/2007 | Gruber | ............... | B62D 33/037 |
| | | | | 292/216 |
| 2008/0252092 A1* | 10/2008 | Waldner | ............... | B62D 33/0273 |
| | | | | 296/51 |
| 2009/0250577 A1* | 10/2009 | Townson | ............... | E05D 3/10 |
| | | | | 248/213.1 |
| 2009/0250959 A1* | 10/2009 | Townson | ............... | E05D 3/10 |
| | | | | 296/51 |
| 2009/0250960 A1* | 10/2009 | Townson | ............... | B62D 33/0273 |
| | | | | 296/51 |
| 2012/0324793 A1* | 12/2012 | Abbasi | ............... | B62D 33/0273 |
| | | | | 49/168 |
| 2018/0086392 A1* | 3/2018 | Seki | ............... | B62D 33/0273 |

\* cited by examiner

LATCHING ASSEMBLY FOR MULTI-FUNCTIONAL TAILGATE DOOR

FIELD

The present disclosure relates to a latching assembly for a multi-functional tailgate door.

BACKGROUND

This section provides background information relates to the present disclosure and is not necessarily prior art.

A pickup truck disclosed in U.S. Pat. No. 8,740,279, which issued Jun. 3, 2014 and is incorporated herein by reference in its entirety, includes a multi-functional tailgate spanning a width of the aft end of the cargo bed. The multi-functional tailgate is pivotably coupled to the cargo bed so that the multi-functional tailgate is allowed to pivot about a horizontal axis between a horizontal open position and a closed position. The multi-functional tailgate also includes two doors that can be latched together so as to pivot together (i.e., in the manner described above), or unlatched so as to pivot independently of each other.

In the unlatched position, each door can rotate independently about the horizontal axis (i.e., between the horizontal open position and the closed position) and about a vertical axis (i.e., between a vertical open position and the closed position). When unlatched and pivotable about the vertical axis, each door is vulnerable to door sag because the latching assembly does not adapt well to the multi-functional aspect of the tailgate door. The teachings of the present disclosure provide a latch assembly that restricts sag in each door when the multi-functional tailgate door is unlatched and pivoting about the vertical axis.

SUMMARY

This section provides a general summary of the disclosure, and is not a comprehensive disclosure of its full scope or all of its features.

In one form, the present disclosure provides a vehicle that includes a cargo bed, one door, and a latch assembly. The cargo bed includes a plurality of walls. The one door is coupled to the cargo bed and pivotable about a horizontal axis between a closed position and a horizontal open position, and about a vertical axis between the closed position and a vertical open position. The latch assembly includes a striker pin, a latch mechanism, a receiver, and a cam. The striker pin is attached to a respective one of the plurality of walls so as to extend outwardly therefrom. The latch mechanism coupled to the door and selectively latched onto the striker pin. The receiver is coupled to the respective one of the plurality of walls. The cam is coupled to the latch mechanism. The cam and the receiver cooperate to restrict vertical movement of the one door when the one door is pivotable about the vertical axis.

In some configurations, the receiver has an angled surface.

In some configurations, the cam of the latch assembly includes a mounting portion and an engagement portion. The mounting portion is coupled to the latch mechanism and the engagement portion has an angled surface.

In some configurations, a portion of the angled surface of the engagement portion contacts a portion of the angled surface of the receiver once the latch mechanism is latched onto the striker pin.

In some configurations, the engagement portion of the cam is at least partially received in a recess of the receiver once the portion of the angled surface of the engagement portion contacts the portion of the angled surface of the receiver.

In some configurations, the cam and the receiver of the latch assembly cooperate to restrict movement of the latch mechanism along a longitudinal axis of the striker pin.

In some configurations, the cam of the latch assembly includes a cam slot that receives the striker pin once the latch mechanism is latched onto the striker pin.

In some configurations, the cam and the receiver are disposed between the latch mechanism and the corresponding wall of the cargo bed once the latch mechanism is latched onto the striker pin.

In some configurations, the receiver of the latch assembly is shaped.

In some configurations, another door is coupled to the cargo bed and pivotable with the one door about the horizontal axis.

In some configurations, the another door is pivotable independently of the one door about the horizontal and vertical axes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
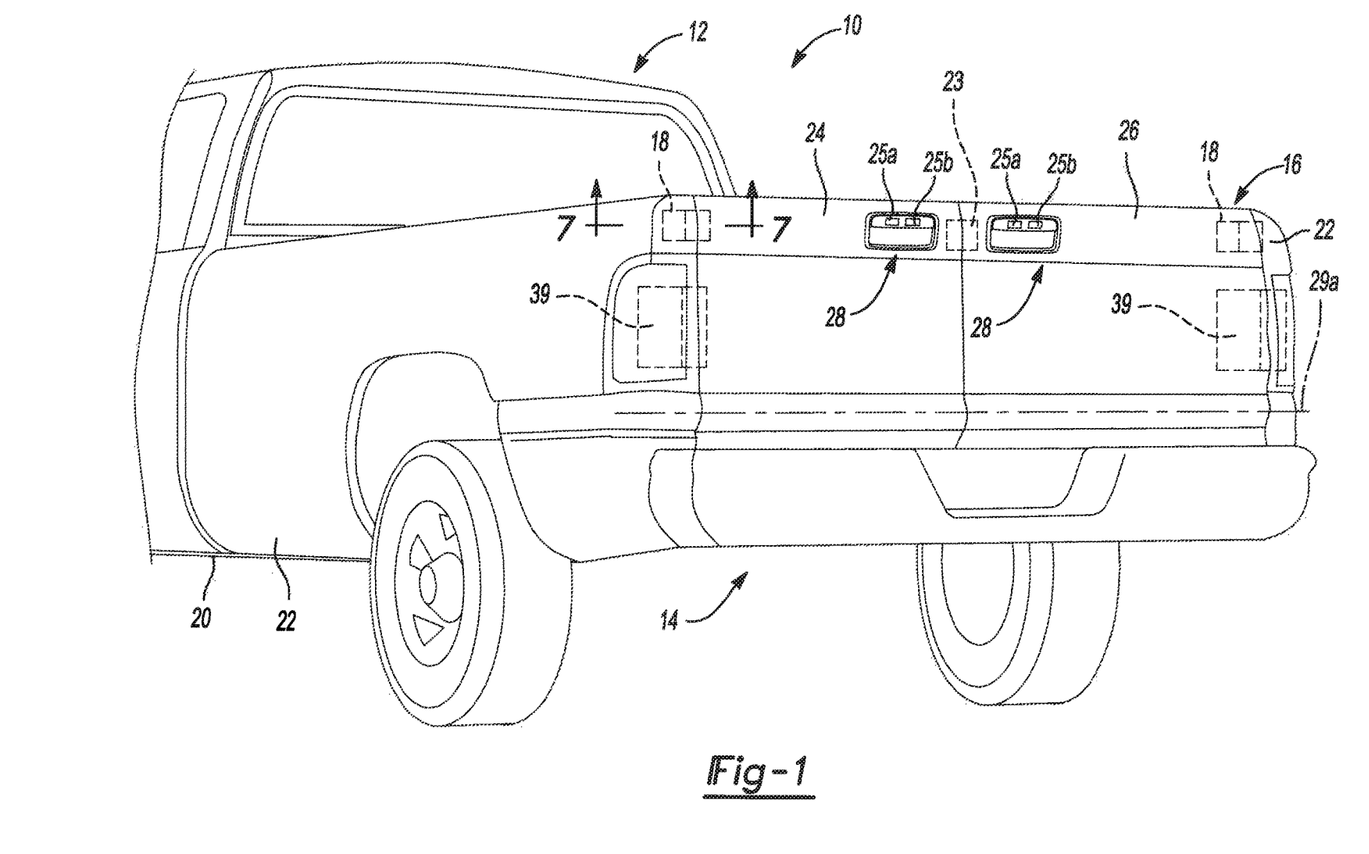
FIG. 1 is a partial perspective view of a vehicle having a pair of latch assemblies, a cargo bed and a multi-functional tailgate according to the principles of the present disclosure.
Figure 2:
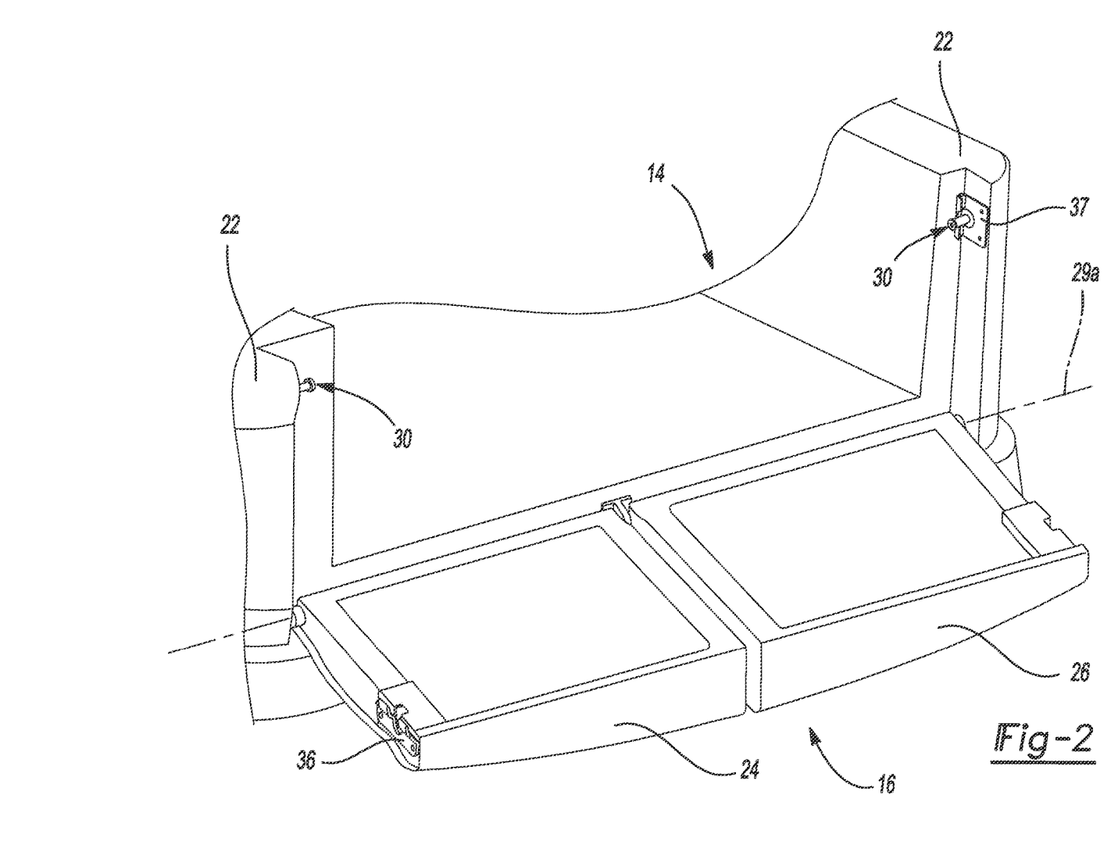
FIG. 2 is a partial perspective view of the cargo bed of FIG. 1 with left and rights doors of the multi-functional tailgate in a horizontal open position.
Figure 3:
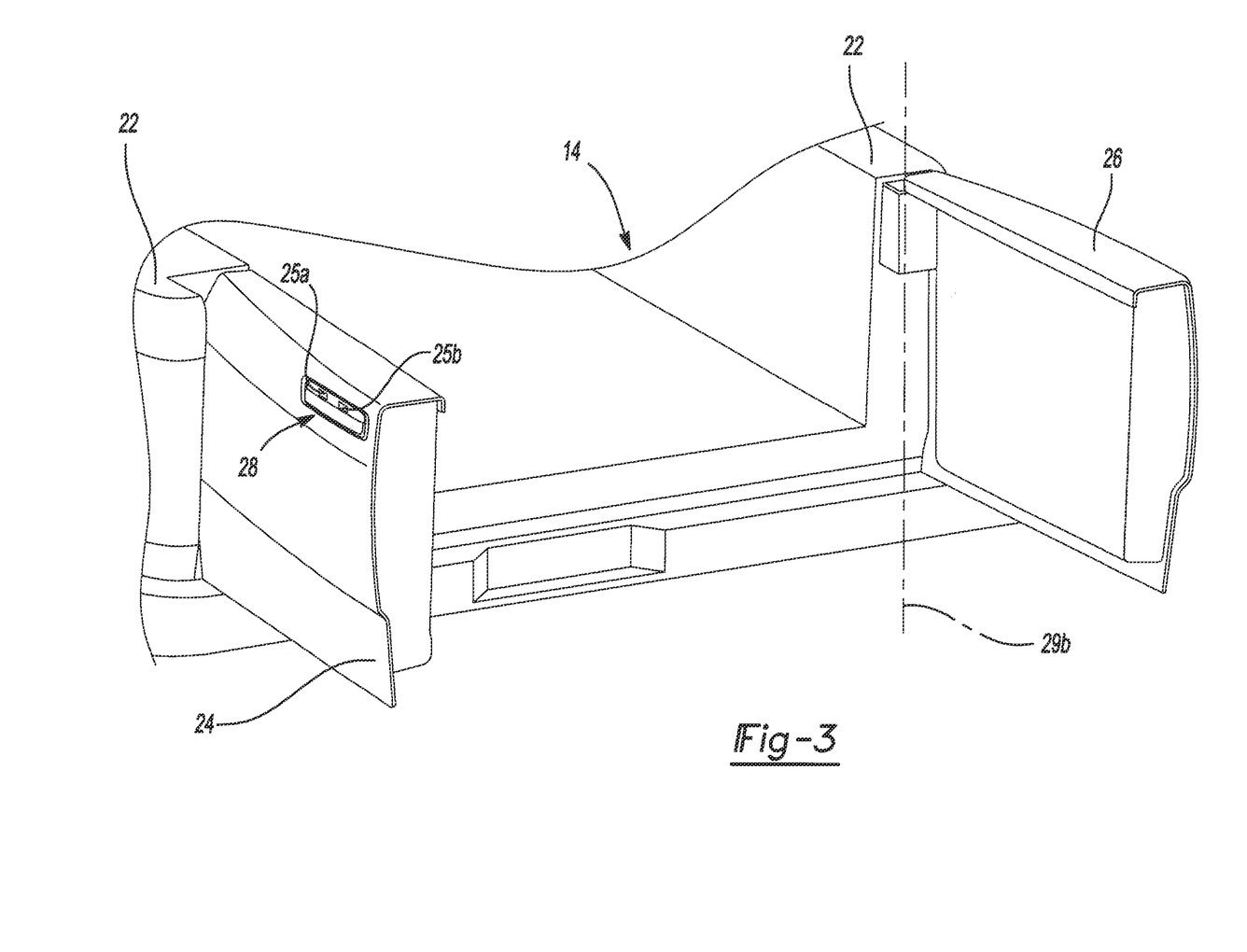
FIG. 3 is a partial perspective view of the cargo bed of FIG. 1 with the left and right doors of the multi-functional tailgate in a vertical open position.

With reference to FIGS. 1-3, a vehicle 10 is provided. The vehicle includes a cab 12, a cargo bed 14, a multi-functional tailgate 16, and a pair of latch assemblies 18. The cargo bed 14 is attached to an aft end 20 of the cab 12 and includes side walls 22 extending between fore and aft ends of the cargo bed 14. The multi-functional tailgate 16 spans across the aft end 20 of the cargo bed 14 and is pivotably coupled thereto. The multi-functional tailgate 16 includes left and right doors 24, 26. Each door 24, 26 of the tailgate 16 includes a handle 28 attached thereto and is independently pivotable between a closed position (FIG. 1) and a horizontal open position (FIG. 2) about horizontal axis 29a. Each door 24, 26 is also independently pivotable between the closed position and a vertical open position (FIG. 3) about respective vertical axes 29b.

Each handle 28 includes a pair of actuators 25a, 25b (e.g., push buttons, touchpads, etc.), which are operatively connected to a door latch assembly 23 and a respective latch assembly 18, respectively. Actuating the actuator 25a unlatches the door latch assembly 23 to permit the doors 24, 26 to independently pivot about the respective vertical axis 29b (FIG. 3) while actuating the actuator 25b unlatches the respective latch assembly 18 to permit the doors 24, 26 to pivot together or independently (depending on whether or not the door latch assembly 23 is unlatched) about the horizontal axis 29a. Under some circumstances, it is more convenient to access the cargo bed 14 while the doors 24, 26 are pivoted to the vertical open position rather than the horizontal open position.

With continued reference to FIGS. 1-3, the pair of latch assemblies 18 are positioned at opposing ends of the tailgate 16 (FIG. 1). Each latch assembly 18 couples the doors 24, 26 to the respective side wall 22 of the cargo bed 14 via a U-frame (not shown) and allows each door 24, 26 to be independently pivotable between the closed position (FIG. 1) and the vertical open position (FIG. 3) about the vertical axis 29b via hinges 39. As will be described in more detail below, each latch assembly 18 restricts vertical movement (i.e., linear movement of the doors 24, 26 in a vertical direction and/or tilt of the doors 24, 26 relative to the cargo bed 14) of the doors 24, 26 of the tailgate 16 as the doors 24, 26 are unlatched from each other and pivotable about the vertical axis 29b.

Figure 4:
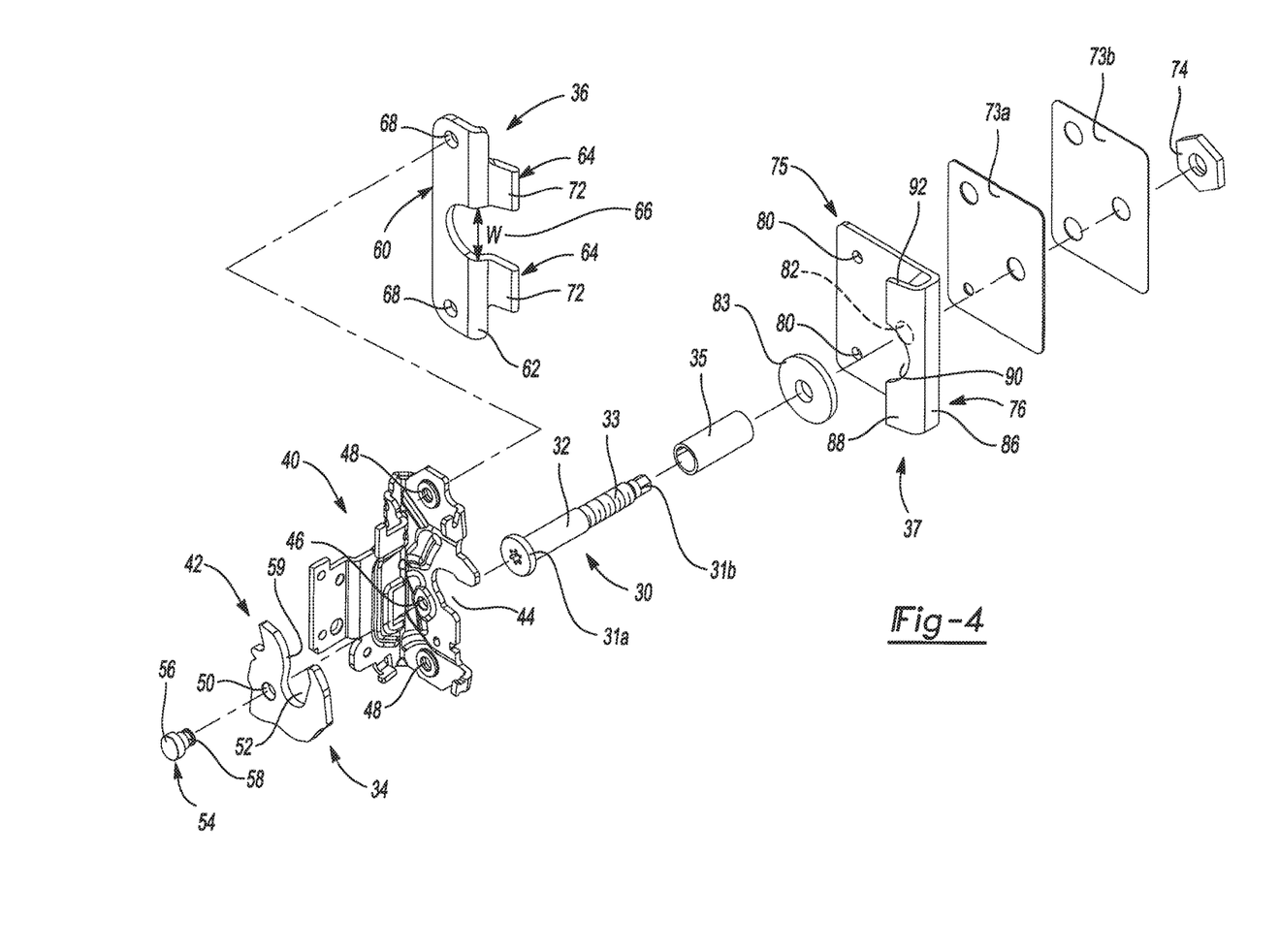
FIG. 4 is an exploded view of one of the latch assemblies.
Figure 5:
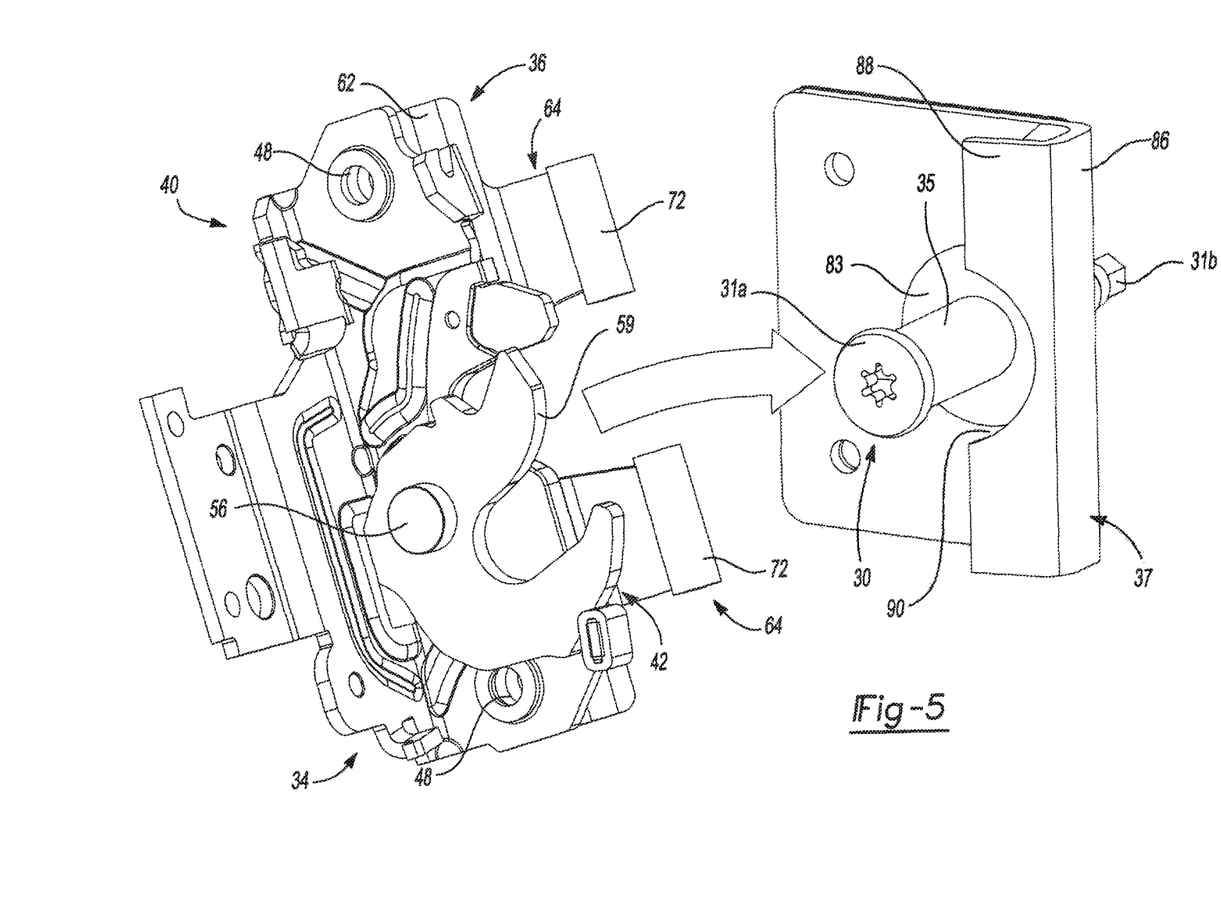
FIG. 5 is a perspective view of the latch assembly shown in FIG. 4 in an unlatched state.
Figure 6:
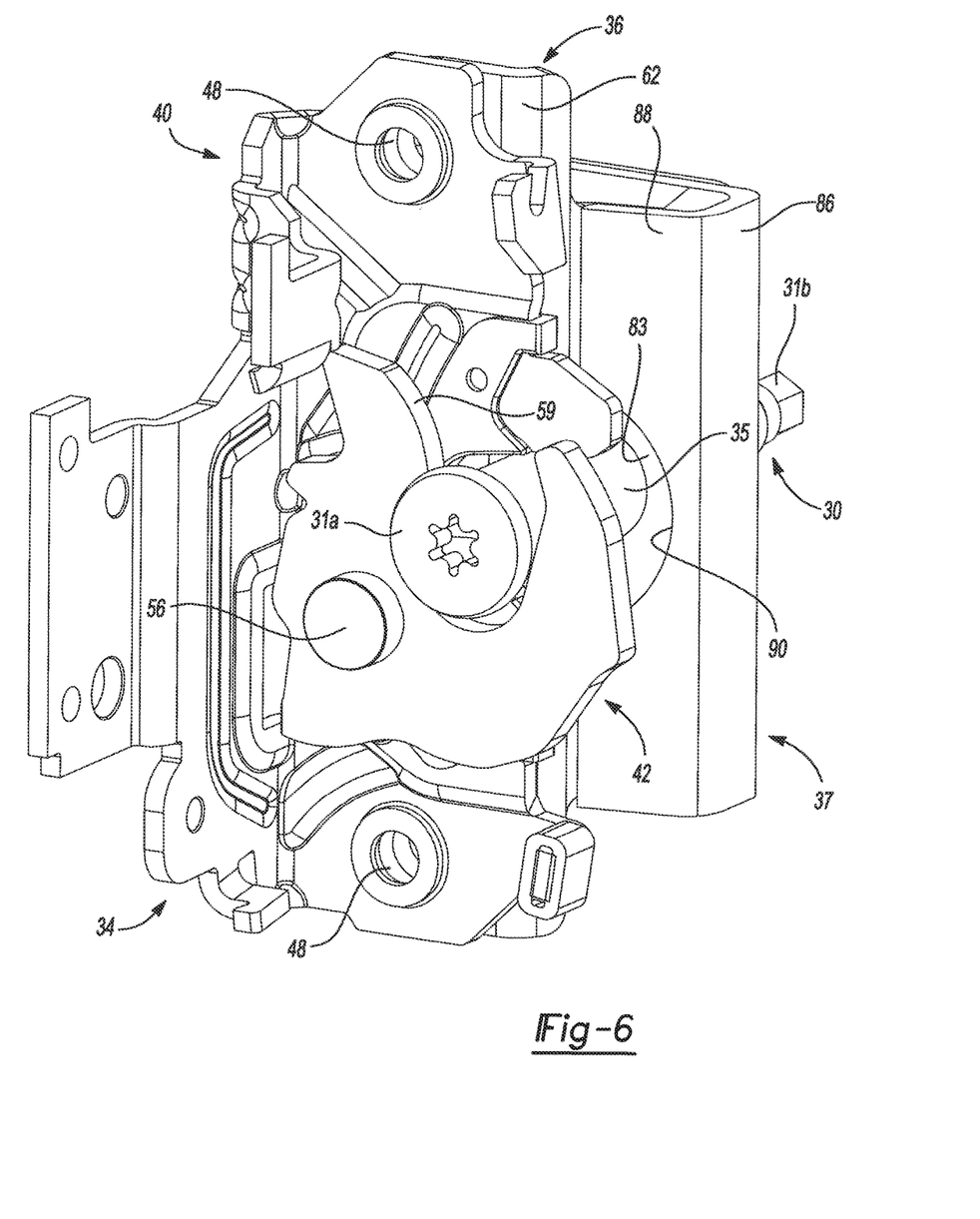
FIG. 6 is a perspective view of the latch assembly shown in FIG. 4 in a latched state.
Figure 7:
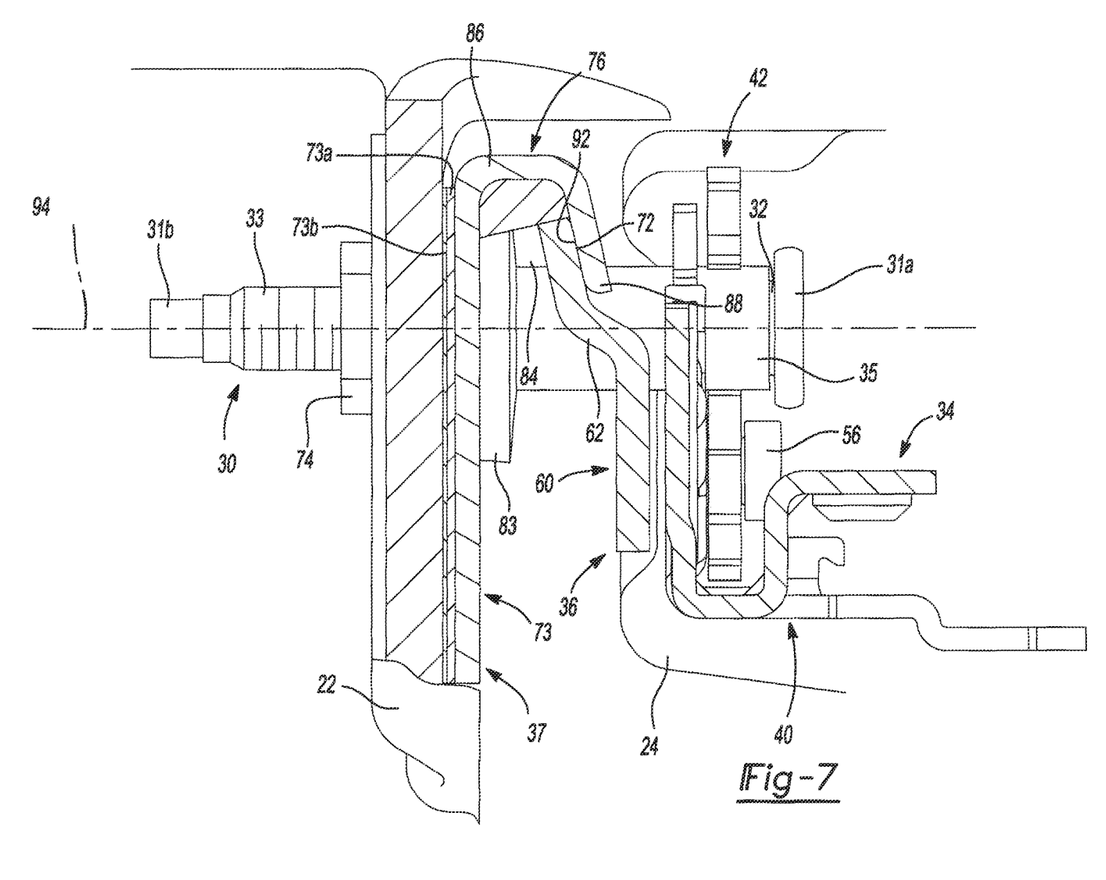
FIG. 7 is a cross-sectional view of the latch assembly taken along line 7-7 of FIG. 1.

With reference to FIGS. 4-7, each latch assembly 18 includes a striker pin 30, a latch mechanism 34, a cam 36, and a receiver 37. The striker pin 30 is attached to a corresponding side wall 22 (FIG. 7) such that the striker pin 30 extends outwardly therefrom. The striker pin 30 includes a circular head portion 31a, an end portion 31b, a cylindrical-shaped latch shaft 32 and a threaded cylindrical-shaped wall shaft 33. As shown in FIG. 3, the latch shaft 32 and the wall shaft 33 are disposed between the head portion 31a and the end portion 31b. The latch shaft 32 has a larger diameter than the wall shaft 33 and the wall shaft 33 is threadably attached to the side wall 22 of the cargo bed 14 via a hex nut 74 (FIG. 7). As shown in FIGS. 5-7, a bushing 35 is sleeved over the latch shaft 32 of the striker pin 30 to reduce wearing of the latch shaft 32, for example.

The latch mechanism 34 is coupled to the tailgate 16 and the cam 36, and is configured to latch onto the latch shaft 32 of the striker pin 30, thereby restricting the doors 24, 26 from pivoting to the horizontal open position (FIG. 2) about the horizontal axis 29a. As shown in FIGS. 4-7, the latch mechanism 34 includes a latch plate 40 and a latch fork 42. The latch plate 40 includes a U-shaped slot 44 (FIG. 4), a latch fork aperture 46 (FIG. 4), and a pair of cam apertures 48. The slot 44 is generally disposed between the pair of cam apertures 48 and receives the latch shaft 32 of the striker pin 30 therein once the latch mechanism 34 latches onto the latch shaft 32 of the striker pin 30. The latch fork aperture 46 is also disposed between the pair of cam apertures 48.

The latch fork 42 is operatively connected to the handle 28 of a respective door 24, 26 via a wire (not shown) or the like and includes a latch plate aperture 50 and a U-shaped slot 52. As shown in FIG. 4, the latch plate aperture 50 is aligned with the latch fork aperture 46 of the latch plate 40. A fastener 54 (e.g., rivet or bolt) including a head 56 and a shaft 58 pivotably attaches the latch fork 42 and the latch plate 40. That is, the shaft 58 of the fastener 54 extends through the latch fork aperture 46 of the latch plate 40 and the latch plate aperture 50 of the latch fork 42 such that the latch fork 42 is pivotable relative to the latch plate 40 from a latched state (FIG. 6) to an unlatched state (FIG. 5) when the actuator 25b is actuated.

The slot 52 includes a rounded surface 59 that facilitates alignment of the striker pin 30 within the slot 52. That is, if the striker pin 30 contacts the rounded surface 59 while the latch mechanism 34 is being latched onto the striker pin 30, the striker pin 30 traverses along the surface 59 until the slot 52 and the striker pin 30 are aligned, thereby allowing the striker pin 30 to be received therein.

The cam 36 is coupled to the latch plate 40 and includes a mounting portion 60, a descending portion 62, an engagement portion 64, and a U-shaped slot 66. The mounting portion 60 includes a pair of apertures 68 that are aligned to corresponding cam apertures 48 (FIG. 4). A fastener (not shown) extends through each aperture 48, 68 to couple the mounting portion 60 of the cam 36 and the latch plate 40 together and to the U-frame (not shown). The descending portion 62 is attached on either end to the mounting portion 60 and the engagement portion 64. As shown in FIGS. 4 and 7, the descending portion 62 is angled downward toward the engagement portion 64 from the mounting portion 60. The engagement portion 64 includes an angled surface 72 that contacts the receiver 37 once the latch mechanism 34 is latched onto the striker pin 30 (FIG. 7).

As shown in FIG. 4, the U-shaped slot 66 extends through the engagement portion 64, the descending portion 62, and partially through the mounting portion 60. The width W of the slot 66 is larger than widths of the U-shaped slots 44, 52 of the latch plate 40 and the latch fork 42, respectively. An entire diametrical surface of the latch shaft 32 of the striker pin 30 and the bushing 35 sleeved thereon are received in the slot 66 of the cam 36 once the latch mechanism 34 latches onto the striker pin 30 (FIG. 7).

The J-shaped receiver 37 is coupled to the side wall 22 of the cargo bed 14 via bracket plates 73a, 73b (FIG. 7). The receiver 37 includes an attachment plate 75 and a substantially L-shaped flange 76. The attachment plate 75 abuts against the bracket plate 73a on a side thereof and includes a pair of wall apertures 80 and a striker pin aperture 82. The striker pin aperture 82 receives the wall shaft 33 of the striker pin 30 when the striker pin 30 is attached to the side wall 22 of the cargo bed 14. A washer 83 is disposed between the latch shaft 32 of the striker pin 30 and the attachment plate 75 of the receiver 37.

As shown in FIG. 7, the flange 76 extends perpendicularly from the attachment plate 75 and cooperates therewith to form a recess 84 that receives the engagement portion 64 of the cam 36 once the latch mechanism 34 is latched onto the latch shaft 32 of the striker pin 30. The flange 76 includes an extension member 86 and a contact member 88. The extension member 86 is perpendicular to the attachment plate 75 and angled relative to the contact member 88.

The contact member 88 includes a U-shaped slot 90 (FIGS. 4-6) and an angled surface 92 (FIGS. 4 and 7). The slot 90 accommodates a portion of the striker pin 30 once the latch mechanism 34 latches onto the striker pin 30 and the bushing 35 sleeved thereon. The angled surface 92 contacts the angled surface 72 of the engagement portion 64 (FIG. 7) once the latch mechanism 34 latches onto the striker pin 30 and the bushing 35 sleeved thereon. In this way, the cam 36 and the receiver 37 cooperate to restrict movement of the latch mechanism 34 along a longitudinal axis 94 of the striker pin 30. This also restricts vertical movement of the doors 24, 26 as the doors 24, 26 are unlatched and pivotable about the vertical axis 29b.

With continued reference to FIGS. 1-7, operation of the latch assembly 18 will be described in detail. It should be understood that although operation of the latch assembly 18 will be explained with respect to the door 24 of the tailgate 16 and the corresponding side wall 22, operation of the latch assembly 18 will function identically or in a similar manner with respect to the door 26 of the tailgate 16. A vehicle user (not shown) can initially have the door 24 of the multi-functional tailgate 16 pivoted about the horizontal axis 29a to the horizontal open position (FIG. 2) for access to the cargo bed 14. If the user determines that accessing the cargo bed 14 is more convenient while the door 24 is pivoted to the vertical open position (FIG. 3) about the vertical axis 29b, the user will first pivot the door 24 from the horizontal open position (FIG. 2) to the closed position (FIG. 1) about the horizontal axis 29a such that the latch mechanism 34 latches onto the striker pin 30.

During rotation of the door 24 toward the closed position, the latch mechanism 34 is initially slidable along the striker pin 30 to accommodate build variation between both the latch mechanism 34 and the striker pin 30. The angled surface 72 of the cam 36 provides clearance to the angled surface 92 of the receiver 37 so that the angled surfaces 72, 92 of the cam 36 and the receiver 37, respectively, contact one another regardless of the latch mechanism 34 adjustment along the striker pin 30. FIG. 7 shows an example of the angled surfaces 72, 92 of the cam 36 and the receiver 37, respectively, contacting each other. In some configurations, for example, a front portion of the angled surface 72 of the cam 36 will only contact a front portion of the angled surface 92 of the receiver 37 (i.e., when there is a greater adjustment of the latch mechanism 34 along the striker pin 30 to accommodate for build variation). That is, the latch mechanism 34 can slide further along the latch shaft 32 of the striker pin 30 towards the head portion 31a when the door 24 is rotated to the closed position, thereby causing the front portion of the angled surface 72 of the cam 36 to only contact the front portion of the angled surface 92 of the receiver 37.

While the door 24 is in the closed position and unlatched from the door 26, the user is allowed to pivot the door 24 about the vertical axis 29b. The cam 36 cooperates with the receiver 37 to restrict movement of the latch mechanism 34 along the longitudinal axis 94 of the striker pin 30. This also restricts vertical movement of the door 24.

It should be understood that although the benefits of latch assembly 18 described herein are with respect to the multi-functional tailgate 16 coupled to the cargo bed 14 of an automotive vehicle, the latch assembly 18 could be utilized on various other applications that involve a multi-functional door that is able to pivot about multiple axes or on applications where a latch mechanism sliding along a striker pin is undesirable.

What is claimed is:

1. A vehicle comprising:
   a cargo bed including a plurality of walls;
   one door coupled to the cargo bed and pivotable about a horizontal axis between a closed position and a horizontal open position, the one door also pivotable about a vertical axis between the closed position and a vertical open position; and
   a latch assembly including a striker pin, a latch mechanism, a receiver, and a cam, the striker pin attached to a respective one of the plurality of walls so as to extend outwardly therefrom, the latch mechanism coupled to the one door and selectively latched onto the striker pin, the receiver coupled to the respective one of the plurality of walls, the cam coupled to the latch mechanism and the one door,
   wherein the cam and the receiver cooperate to restrict vertical movement of the one door when the one door is pivotable about the vertical axis.

2. The vehicle of claim 1, wherein the receiver has an angled surface.

3. The vehicle of claim 2, wherein the cam of the latch assembly includes a mounting portion and an engagement portion, and wherein the mounting portion is coupled to the latch mechanism and the engagement portion has an angled surface.

4. The vehicle of claim 3, wherein a portion of the angled surface of the engagement portion contacts a portion of the angled surface of the receiver once the latch mechanism is latched onto the striker pin.

5. The vehicle of claim 4, wherein the engagement portion of the cam is at least partially received in a recess of the receiver once the portion of the angled surface of the engagement portion contacts the portion of the angled surface of the receiver.

6. The vehicle of claim 1, wherein the cam and the receiver of the latch assembly cooperate to restrict movement of the latch mechanism along a longitudinal axis of the striker pin.

7. The vehicle of claim 1, wherein the cam of the latch assembly includes a cam slot that receives the striker pin once the latch mechanism is latched onto the striker pin.

8. The vehicle of claim 1, wherein the cam and the receiver are disposed between the latch mechanism and the corresponding wall of the cargo bed once the latch mechanism is latched onto the striker pin.

9. The vehicle of claim 1, wherein the receiver of the latch assembly is J-shaped.

10. The vehicle of claim 1, wherein another door is coupled to the cargo bed and pivotable with the one door about the horizontal axis.

11. The vehicle of claim 10, wherein the another door is pivotable independently of the one door about the horizontal and vertical axes.

* * * * *